United States Patent [19]

Eberle

[11] Patent Number: 5,074,678
[45] Date of Patent: Dec. 24, 1991

[54] ROLLING BODY

[75] Inventor: Jürg Eberle, Hinwil, Switzerland

[73] Assignee: SFT AG Spontanfoerdertechnik, Weinfelden, Switzerland

[21] Appl. No.: 490,557

[22] PCT Filed: Aug. 18, 1989

[86] PCT No.: PCT/CH89/00149
§ 371 Date: Apr. 20, 1990
§ 102(e) Date: Apr. 20, 1990

[87] PCT Pub. No.: WO90/02269
PCT Pub. Date: Mar. 8, 1990

[30] Foreign Application Priority Data

Aug. 31, 1988 [CH] Switzerland ............... 3245/88
Jul. 20, 1989 [CH] Switzerland ............... 2707/89

[51] Int. Cl.$^5$ .................................. F16C 29/04
[52] U.S. Cl. ........................................... 384/49
[58] Field of Search ............... 384/7, 18, 35, 48, 49

[56] References Cited

U.S. PATENT DOCUMENTS 2,830,824 4/1958 Young .
2,917,350 12/1959 Ragsdale ....................... 384/49
2,952,145 9/1960 Thompson .
4,297,913 11/1981 Garbo ......................... 384/49 X

FOREIGN PATENT DOCUMENTS

323334 7/1918 Fed. Rep. of Germany .
2843935 4/1980 Fed. Rep. of Germany .
56419 4/1936 Norway ....................... 384/49
212132 11/1968 U.S.S.R. .
1431980 10/1988 U.S.S.R. .

Primary Examiner—Thomas R. Hannon
Attorney, Agent, or Firm—Walter C. Farley

[57] ABSTRACT

A rolling body with guide channel, in which a rolling element cage with rolling elements is arranged in the rolling body and the guide channel has rail members for the rolling of the rolling elements, is characterized in that the rolling body has a rolling element cage, in which in recesses are provided at least one preferably triplet of three rolling elements, in such a way that the centers of the rolling elements have the same reciprocal spacings and that in the guide channel for each rolling element of the triplet is provided a guide rail, the guide rails being so reciprocally positioned and spaced, that with the rolling body inserted therein the rolling elements of the triplet are in reciprocal contact and each is in contact with rail member. In the case of a purely suspended operation, a pair of two rolling element can be used in place of a triplet. However this is a special case for an operating form in which only tensile loads occur at right angles to the guide channel.

14 Claims, 7 Drawing Sheets

ROLLING BODY

The invention relates to linear guides and is directed to a process for the controlled rolling of rolling elements located in a guide and a longitudinal guidance system constructed according to this process having rolling bodies and a rolling body guide matched thereto.

BACKGROUND OF THE INVENTION

Rolling bodies (e.g. roller gear tables) and their corresponding guides on which they run are used for the low-friction performance of movement sequences, particularly linear movement sequences, for which a specific linear or longitudinal guide system type has been designed. Numerous longitudinal guide systems with rolls, balls and other rolling bodies are known. What is always sought is a very low-friction relative movement between two bodies, e.g. a guide or path and an element movable thereon, i.e. the rolling body. Nowadays such longitudinal guides are a function of the components of conventional ball bearings, whereof numerous different constructions exist. It is common to all of them that the balls are arranged in a row, which are collected in lined up manner in a ball race or cage. An example is provided by U.S. Pat. No. 2,952,145, in which two rows of balls are so arranged with respect to one another that they roll on one another. The object is to minimize sliding friction, but this only occurs in the indicated construction if the force pattern through the loading passes precisely through two ball pairs. However, this loading case is critical and cannot be maintained in operation, because the two parts displaceable relative to one another and mounted on balls undergo reciprocal turning and even the slightest rotation means that the apparatus is not operating in an optimum manner. Thus, there is no real operating case leading to the objective of the aforementioned U.S. Patent because, as stated, this construction cannot absorb a "sloping" force application without a considerable rise in the sliding friction. Thus, despite the symmetry of the solution the optimum force application is limited to a single point for each pair of balls.

Due to the necessary manufacturing precision, these rolling bodies with the always associated race-way are generally expensive and for most applications specially adapted types or constructions have to be used. However, this means that they can only be used in one field and there is no universal usage.

Roll guidance systems exist which comprise a guide rail and two associated guide blocks, which are interconnected by means of a web to form a guide carriage (rolling body). When the guide block moves on the rails, the balls revolve in closed ball races via a return channel. Such ball rotation elements are particularly suitable for large distances and can be operated in any position. However, such ball rotation paths are also subject to problems and in the case of rolling element return guides, feed impacts of said elements must be avoided, which involves corresponding technical expenditure. For example, the balls must be pressed with a constant pressure against the guide contact surfaces of the rail. This is also necessary in order to bring about a stick-slip-free displaceability. In addition, it is generally necessary to use profile-ground raceways. Although these solutions are robust and proven, they are complicated and expensive.

For the lowest possible friction, guide rails exist with single-row flat ball cages and the rolling elements are in two-point contact with the raceways. These linear guides adapt in optimum manner to the loading direction and are not sensitive to angle errors in the transverse direction. They are not suitable for passing round curves. Preference is given to the use of needle rolls, cylinder rolls, etc. with which loose bearings are also possible in flat cage guides.

In general, ball rails for ball guides are used for higher speeds and loadings. Roll rails are suitable for exact adjusting movements. Ball guides are robust and roll guides, particularly cross roll guides, are precise (clearance-free).

SUMMARY OF THE INVENTION

An object of the present invention is to provide a process according to which it is possible to have longitudinal guidance systems with rolling bodies and rolling body guides, which have a low overall frictional resistance in such a way that the proportion of the rolling resistance preponderates in all conventional loading cases and the frictional resistance of the rolling body is always kept at a minimum. In addition, the overall longitudinal guidance system must make it possible to use a very high proportion of plastics, without impairing the characteristics required of longitudinal guidance systems. This must lead to a longitudinal guidance system which has a slip-stick-free displaceability, minimum frictional resistance, unrestrictedly long displacement paths and this must be achievable with low production costs using materials, e.g. plastics, which are favourable from the cost and processing standpoint and which also permits a more universal use than is the case with conventional longitudinal guidance systems. The aim is the provision of such a longitudinal guidance system according to the process.

Briefly described, the invention includes a process for the controlled rolling of rolling elements rolling in a guide, particularly isotropic rolling elements, as seen as a loading force loads the rolling elements during rolling, characterized in that at least two rolling elements, the guide and the means for coupling the loading force to the rolling elements are so reciprocally arranged that each rolling element contacts the guide and also are in reciprocal single-point contact. The means for coupling the loading force contacts a rolling element in such a way that the force action through the rolling element perpendicularly strikes and centrally crosses the connecting line between the two contact points between the guide and the rolling element and the individual rolling elements, half of the connecting line being equal in length to the rolling radius.

As stated, a longitudinal guidance system comprises a rolling body and its rolling body guide. The rolling body comprises parts moved relative to one another, much as in the system consisting of the car and the road, in which the car (seen from the engine) comprises a seat housing and rolling wheels. The problem is therefore also to cope with the relative movements within the rolling body.

In the same way as the weight of the seat housing in the car is supported on the axles with the wheels (rolling elements) arranged thereon, the ball cage or the like of a rolling body must be supportable on the rolling element in order to bring the force action to the guideway.

The invention is based on the idea that if it is possible to support the ball cage on the balls in such a way that there is a minimum sliding friction, most of the total frictional resistance is limited to rolling friction, which has very low resistance. It is much easier to technically control rolling friction than sliding friction.

The low-friction coupling in of forces (e.g. a compressive force) by means of two bodies moving relative to one another, i.e. from one body to the other, takes place most advantageously if the relative movement between the bodies is close to or is zero. In the case of rolling bodies this constitutes a problem. Thus, in the case of one rolling ball the circumferential speed is only zero or close thereto at the rotation centre, i.e. the place through which the rolling axis passes and in the immediate vicinity thereof. However, in the case of a ball, which can be looked upon as an isotropic body, this rolling axis can be anywhere, or more correctly in an infinite number of positions. Therefore an object also exists of controlling the rolling elements in such a way that their rolling axes during rolling are located in space in such a way that the ball cage can be supported in a region close to the rotation center, i.e. a rotation invariant zone on a rolling ball and is also in fact supported there under different circumstances of loading.

From the process standpoint, the invention achieves this object in that, for controlled rolling of rolling elements rolling in a guide, particularly those with high symmetry (balls), if a loading force loads the rolling elements during rolling, for at least two rolling elements, the guide and for the means for coupling in the loading force on the rolling elements, an arrangement is chosen so that one side of each rolling element contacts the guide and on the other side are in reciprocal contact at one point, the means for coupling in the loading force contacting a rolling element in such a way that the force action through the rolling element perpendicularly strikes the connecting line between the two contact points between the guide and the rolling element and the individual rolling elements and crosses same centrally, the halved connecting line being identical to the rolling radius.

The rolling element radii are to be made smaller than the largest radius of the rolling element.

In the case of three rolling elements, the guide and the means for coupling in the loading force are so reciprocally arranged that each rolling element contacts the guide and are in reciprocal contact at one point, the means for coupling in the loading force so contacting a rolling element that the force action through the rolling element perpendicularly strikes and centrally crosses a connecting line between the two contact points between the guide and the rolling element and the individual rolling elements, the halved connecting line being identical to the rolling radius.

As a result of a specific arrangement of the rolling elements in a cage and during rolling also a relationship to a guide channel with ball rails, on which the rolling elements can roll, a longitudinal guidance system with the aforementioned advantages is created. Although the geometrically symmetrical ball shape has the least positionally defined behaviour, the preferred embodiment makes use of balls as rolling elements. In the discussion of this embodiment it will be shown that when using the proposed technical teaching there is a uniform stochastic wear to a spherical rolling element over a longer operating period.

Appropriate text books show that the friction coefficient $\mu$ for rolling friction of steel (hard) on steel (hard) is 0.001 and is 0.1 to 0.15 for sliding friction of steel on steel. The approximately equally divided mixed friction thereof between the same hard materials is 0.01 to 0.015, i.e. it is almost precisely halfway between. Constructionally every effort is made to obtain pure rolling friction, which naturally leads to corresponding constraints. A high rolling friction proportion is obtained in a roller or needle bearing and with reservations also in a ball bearing and in linear guides, in which only a cylindrical rolling element provides the force between the two partners moving relative to one another. However, it must be borne in mind that the rolling friction can e.g. exceed a systemimmanent sliding friction from the resistance standpoint.

A longitudinal guidance system according to the invention makes use of the advantages of a ball as a rolling element, whilst still obtaining the other, less desired characteristics. Unlike in the case of conventional longitudinal guidance systems, in the system according to the invention a pretension or prestressing are not required, so that there is also no need to set a bearing clearance. Unrestrictedly long displacement paths can be obtained and forces from all transverse directions and moments about all axes are absorbed in such a way that the basic characteristics are always maintained. No profile-ground raceways are required and also no roll or ball revolution is needed, which occurs where large stroke lengths are needed.

Balls which roll in a cage are supported on the latter during the movement. If this occurs on one part of the cage with a high circumferential speed, sliding friction occurs there and this significantly contributes to the total resistance. Thus, it is advantageous for the cage support acting on the ball arrangement to only come into effect where the ball circumferential speed is 0 or close to 0, i.e. at the two points on the rolling ball where the rolling axis passes out. These are speed-invariant points or rotation centres, which in accordance with the rolling of the ball can be located somewhere on its surface.

An embodiment of the invention using balls as rolling elements is described in greater detail hereinafter relative to the drawings, wherein.

DESCRIPTION OF THE PREFERRED EMBODIMENTS

Figure 1A:
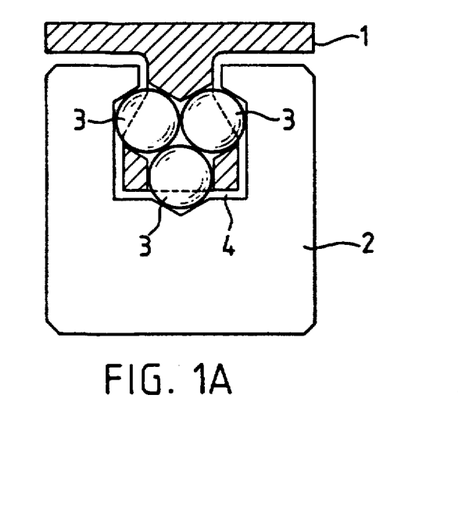
FIG. 1A is a front elevation, in partial section, of a guide channel with a rolling body according to the invention inserted in the guide channel.

As shown in FIG. 1A, the rolling body 1 according to the invention as the basic component is constructed in such a way that it is supported in each movement position on itself, i.e. on its three balls. This basic arrangement comprises three balls 3, whose center, passing over in, describe an equilateral triangle each side of which is the length of two ball radii. The balls roll on one another, i.e. permits an unrestricted stroke without having to follow one ball rotation path. Each ball has four possible contact points for rolling. Each ball can bear at two points on ball rails 6 of a member in the running channel 4 and on two points with one each on a partner ball, so that there are nine instead of twelve possible contact points for three balls. It will be shown hereinafter that in different loading cases 3 to 6 of these contacting points are simultaneously used for supporting and rolling purposes. On the ball rail 6 of the members in the channel 4 the bearing points have the same spacing as the bearing points with respect to the two partner balls. The balls are loose in a cage (FIG. 1B), i.e. combined or arranged without prestressing. This cage is preferably integrated into the rolling body structure. As a function of the loading case, whereof some will be discussed hereinafter, the balls come into contact with the cage walls at support faces 5, but always at a speed-invariant point, so that the sliding friction resulting from the support effect is at a minimum.

Figure 1B:
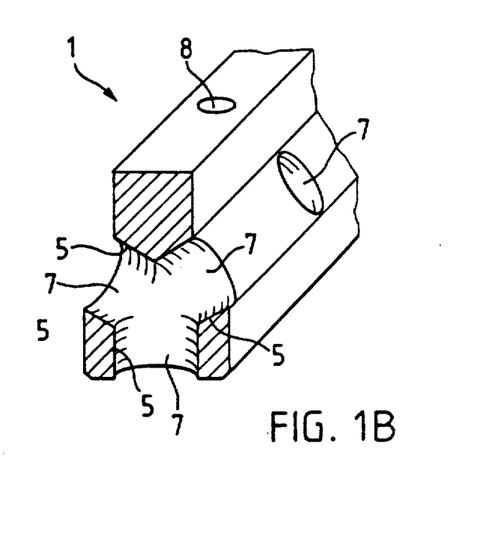
FIG. 1B is a perspective view of a rolling element cage with two ball triplets in perspective and in section through a ball triplet, as shown in FIG. 1A.

FIG. 1B shows in perspective and partial section the rolling element cage with two sets of three rolling element chambers 7, in this case receiving bores, for two ball triplets, the section taken through a channel in which can be housed a ball triplet, as shown in FIG. 1A. The represented configuration is reduced to such an extent that it essentially only represents one ball cage and a web-like member with an attachment opening 8 for fixing the rolling body to another rolling body part. Each rolling body can be regarded as a sub-assembly of a rolling body and as will be described hereinafter, a plurality of rolling bodies can be combined into one.

Figure 1C:
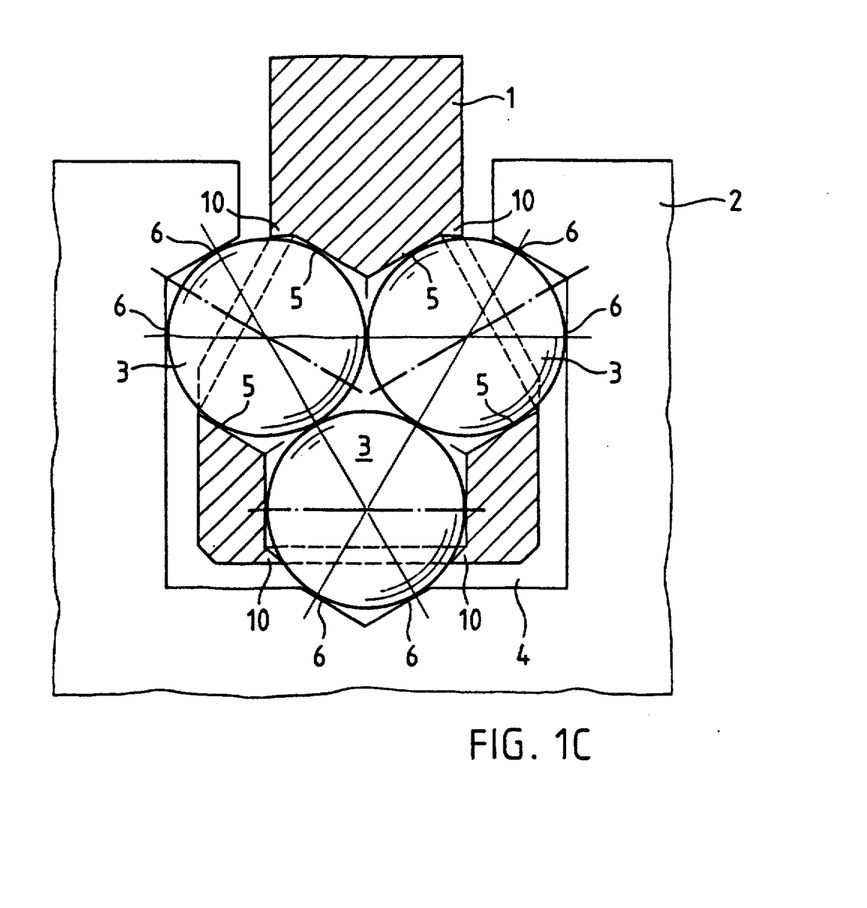
FIG. 1C is an enlarged sectional view of a rolling element cage in the vicinity of the ball centre of the triplet.

FIG. 1C shows the rolling element cage in cross-section in the vicinity of the ball center of a ball triplet housed therein. It is possible to see tapers 10 on the outsides of chambers 7, which keep the balls 3 trapped in their bores. As a function of the material used, e.g. in the case of POM (polyoxymethylene), a plastic from the polyacetal group, which is characterized by high surface hardness and good wear characteristics, the elasticity of the material ensures that through such a taper the ball can be forced through the somewhat smaller entry diameter and snaps into the receiving bore. It is also possible to see the cage bearing points 5 with which the cage is supported on the rotation centers of the rolling balls 3. The actual rolling body runs with its rolling elements along rails, which are arranged in the form of ball rails 6 in the guide channel 4 of guide rail 2.

Figure 1D:
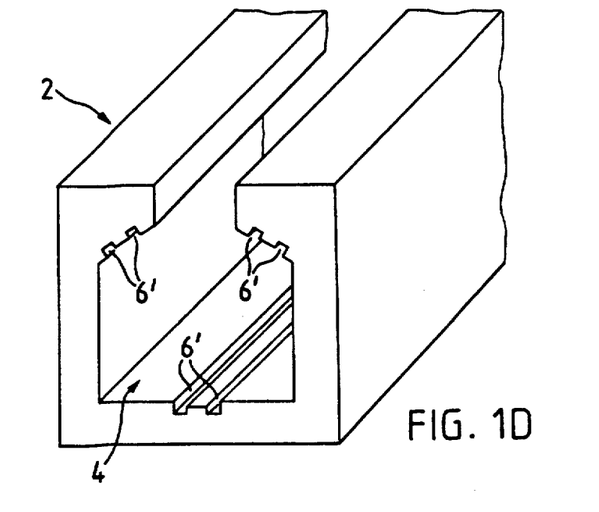
FIG. 1D is a perspective view of a preferred embodiment of a race profile in a guide channel without rolling element rails.
Figure 8:
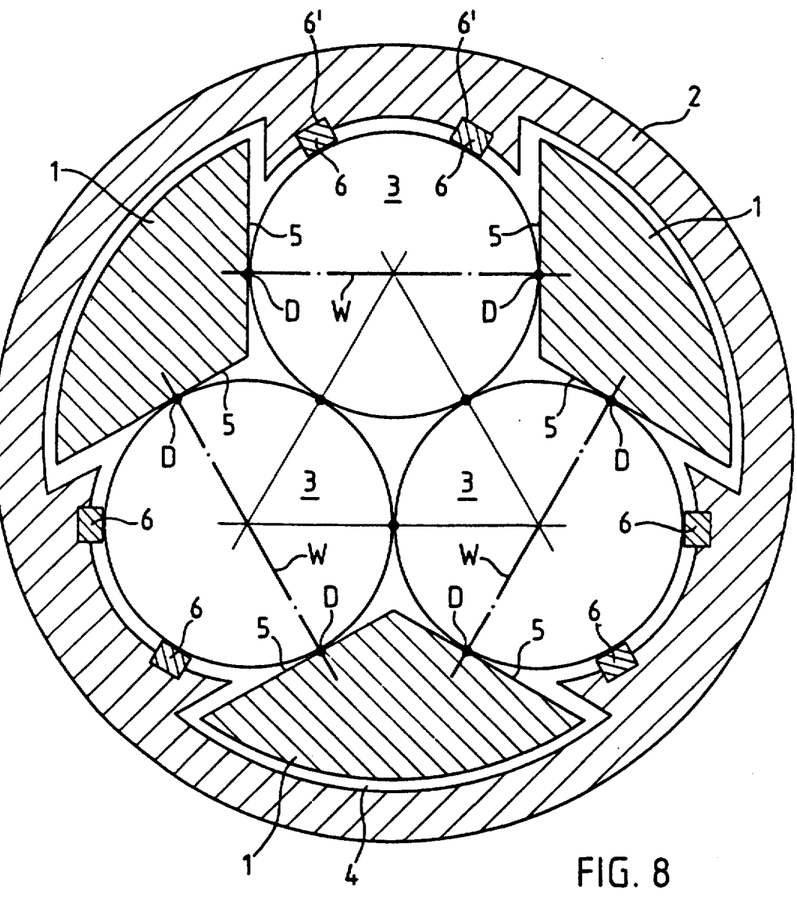
FIG. 8 is an end elevation, in partial section, of embodiment with a closed, tubular rolling body guide, in which the rolling bodies are combined in the form of a chain.

FIG. 1D shows in perspective a preferred embodiment of a raceway profile for a guide channel in a guide rail. The rolling body cage in FIG. 1B matches this. It is possible to see three inclined beds for rails with slots 6' for receiving in each bed two ball rails 6 (not shown), on which the balls 3 of rolling body 1 can roll. The rail members inserted in the beds are preferably provided with flat contact faces, so that the balls contacting the surface of the rail members at one point can follow their path on said face corresponding to the instantaneous load application (c.f. FIG. 8). In the case of flat rail members the tolerance between the balls, the housing and the actual rail members can be greater. When rail members with a curved contact face are used, the tolerances must be smaller.

Figure 2A:
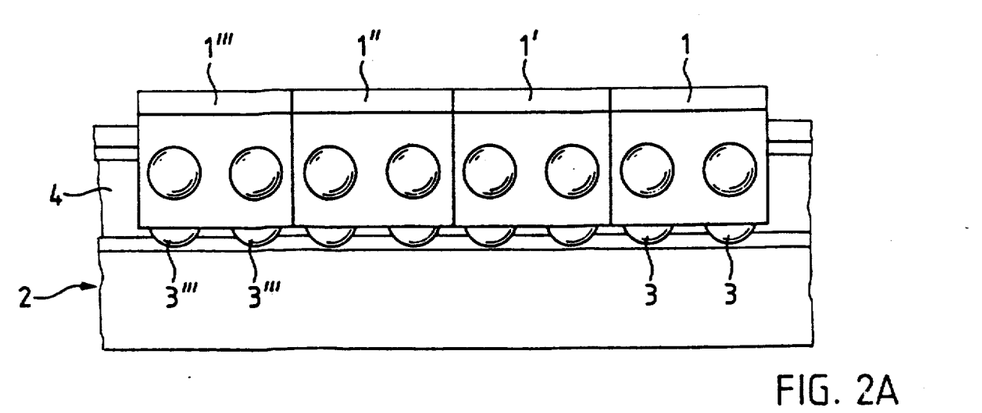
FIG. 2A is a side elevation of a plurality of aligned rolling bodies of the type shown in FIG. 1A, the guide channel being covered, i.e. only one half is visible, so that in this way a "chain" of rolling bodies can be formed and in turn constitutes a rolling body.

FIG. 2A shows a side view of a linear arrangement of individual rolling bodies 1, 1', 1" etc., each of which contains two ball triplets. Such arrangements can be combined in a random manner and/or can be randomly interconnected. With an e.g. elastic connection between the rolling body elements, they can be combined to form a rolling chain. In such a chain using rolling bodies with rolling body elements which only have one triplet, guides with relatively small curve radii can be obtained, so that the rolling body according to the invention can also be advantageously used in chain conveying, in which conveying takes place in all directions in space. In place of the rail members, the guide channel surface can be directly used for ball rolling, particularly if a metal profile is used for the guide channel.

Figure 2B:
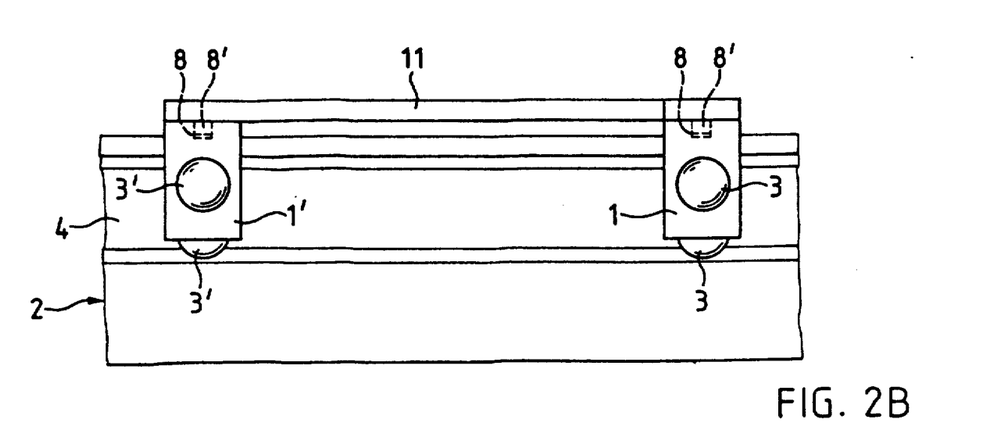
FIG. 2B is a side elevation of a rolling body formed from two sub-rolling bodies with in each case one ball triplet and a connecting web.

FIG. 2B shows another variant as to how rolling bodies can be used in the form of sub-elements. Two rolling bodies 1,1', each with one ball triplet, are rigidly interconnected by means of a web 11 and in this way form a rolling body for a curving longitudinal guide. The fixing means 8,8' can, if desired, be constructed as a pivot bearing with pins in the bore. This example shows how universally the discussed rolling body can be used.

Figure 2C:
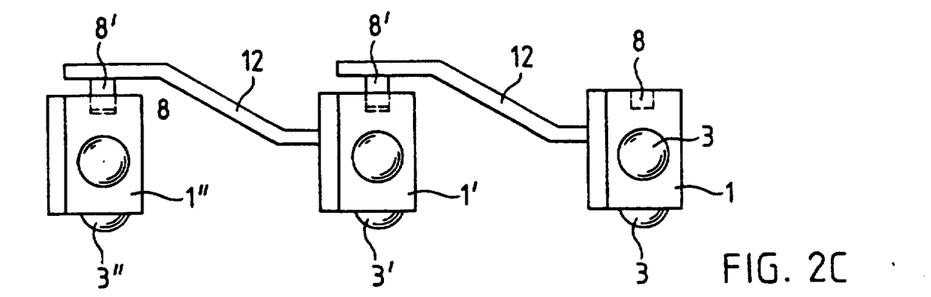
FIG. 2C is a side elevation of a further variant of a plurality of rolling bodies.

A further possibility of universal usability is shown by the lining up of rolling bodies in FIG. 2C. Each rolling body 1,1',1" has on its rolling element cage a linkage 12 with a downwardly directed pin 8' and at the top on said cage a bush 8, in such a way that the pin can be inserted in the bush of a following cage, forming a chain.

Figure 3A:
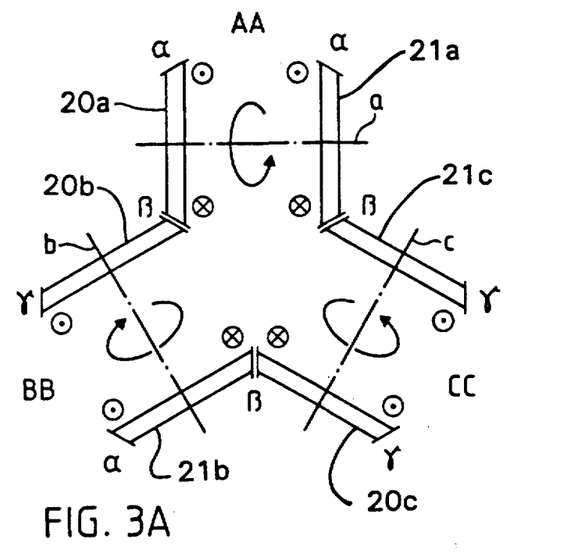
FIG. 3A is a diagrammatic representation of the kinematics of the rolling body abstracted from the ball.

FIG. 3A shows a representation for discussing the kinematic conditions of such a rolling body in the form of an equivalent structure in which each ball is replaced by a pair of gear wheels at opposite ends of an axle shaft. Three driving or driven groups AA, BB and CC comprise each case one shaft a, b and c on which are arranged in two gear wheels 20a, 21a; 20b, 21b and 20c, 21c, respectively which are in engagement with one another or with the exterior at engagement points a, B, 4. Points B,B,B are transition points of the gear wheels from one group to the other and points a,a;a,4;4,4 are transition points from the rolling body to the outside on the guide rail members. In this case AA is a driving group and BB, CC are driven groups. Thus, axle a is the driven axle. In addition to the use of rotation arrows, the rotation direction is also shown by vectors at right angles to the paper plane (dot in ring directed upwards and cross in ring directed downwards). Thus, at points B,B,B the rotation direction is into the paper plane and on the periphery and at points a,4 out of the paper plane, so that the rolling body as a whole rolls into the paper plane or, in other words, would roll or drop downwards through its own weight in a vertical guide standing on the paper plane.

It can be seen that the three wheel pairs with the engagement points a,B,4 behave in the same way as a gear which, rolling on itself, is able to roll along a path. Returning from this equivalent structure to that in which the rolling elements are balls, it will be recognized that the individual gear wheels represented discs cut out of each ball. Forming the same into balls again, it can be seen that the three balls, in the case of isotropic force engagement rolling on one another are able to roll along a path without sliding on one another or one of the free rail members with the two ball rails. The balls are reciprocally supported only at one point, where rolling friction occurs, which has a restraining action in opposition to the rolling direction, as in the case of rolling friction on the rails.

Figure 3B:
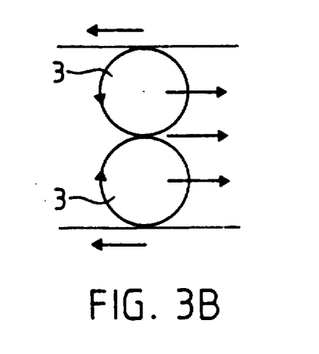
FIG. 3B is a diagrammatic illustration of the "balancing" action on a ball triplet in the rolling direction through the rolling friction between two balls rolling on one another and on a race.

FIG. 3B shows how an approximate balance is maintained with respect to the rolling friction of two balls 3 rolling on one another and moving forward in a guide. Thus, if it is not systematically destabilized, the ball triplet is not supported in uncontrolled manner on the cage walls and does not produce a sliding friction there in uncontrolled manner. This would be the case with permanent supporting on a ball zone with a higher circumferential speed and brief, momentary support effects of this type, which could occur with destabilization must not last for a long time. Thus, the ball triplet must be stabilized in the running direction in the case of rolling. A rolling body triplet rolling in the represented manner has a minimum of sliding friction.

Figure 3C:
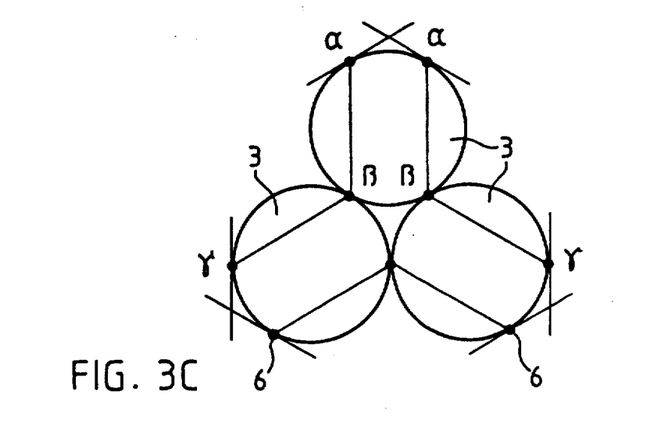
FIG. 3C is a diagrammatic illustration of the preferred pattern of the rolling points between the balls of a triplet with respect to the race.

FIG. 3C shows diagrammatically and based on FIG. 3A a preferred arrangement of the ball rails with respect to the triplet balls, namely in such a way that the spacing α—α of the rails of a rail member is the same as the spacing β—β of the contact points with respect to the two partner balls. The rolling points α are at the location of the ball rail 6 indicated in the bottom part of the drawing. With the indicated triangular arrangement, the rolling radii of all three balls are always the same. This leads to an identical circumferential speed of all the rolling balls, so that the sliding friction between the balls is substantially zero. Furthermore, the force acting from the outside on the ball arrangement is always so subdivided that the force application always passes through the rolling axis and is therefore distributed over the rails in the ball channel in such a way that the ball cage does not have to absorb forces displacing the triplet. Thus, as stated, it is a rolling ball triplet.

In the case of non-use, i.e. outside the guide channel, the balls are loosely mounted in a cage and are only secured against dropping out. The cage can be made from metal or plastic, the hardness of the material used being significant, because in the case of a loading of the balls it must also participate in this loading. The force coupled by the cage into the rotation center is always transferred via two balls to the running channel having for each ball a rail with two bearing points (on the ball rails). Thus, the cage is located on a rotation center (i.e., at one end of the axis of rotation of a ball) of the balls, so that the latter are not exposed to greater friction than results from the size of the spherical surfaces which form if the balls can be pressed into the cage walls. Where the cage must necessarily be supported on the triplet body, the ball surface speed is substantially zero, because the cage is supported on the rotation-invariant part of the ball and the sliding friction must naturally be close to zero there (corresponding to the spherical surface formed by the sunk cavity).

On the basis of FIGS. 4 to 7 and in accordance with FIGS. 1A and 1C certain loading cases of the discussed rolling body in the guide channel will be investigated. For the resolution of the forces, use is made of a vector representation, whose sum vector is indicated as a thick arrow and whose partial vectors are shown as thin arrows. The force represented as a vector is directed in resolved form onto the points in the rolling body at which they act.

Figure 4:
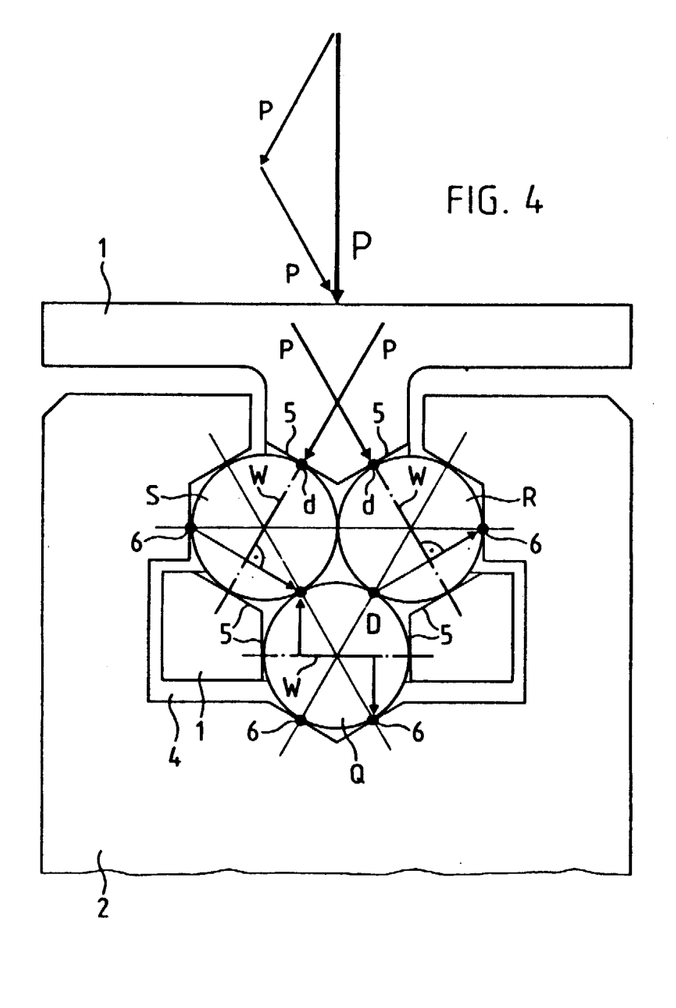
FIG. 4 is an end elevation similar to FIG. 1C showing subdivision of the forces in the rolling body loaded from above through the center of the arrangement (compressive load)

FIG. 4 shows the loading to a rolling body from above, i.e. it is pressed into the rolling body guide with the guide rails and six of the possible nine contact points participate. In this loading case the lower ball Q is pressed against the two ball rails 6 of the rail member. It is simultaneously supported on the two other balls S and R and attempts to force them apart. These two balls are consequently pressed against the ball rails of their rail members, so that the triplet is fixed between the rail members and the balls. As a function of the loading direction, the balls are supported on one or both rails (indicated by a thicker dot). The rolling axis W of ball Q is horizontal (at right angles to the running direction) and the rolling axes W of the two other balls R and S are inclined towards one another at an angle of 60° thereto and are along the sides of a substantially equilateral triangle. The cage, which in the case of non-loading is positioned relatively loosely around the triplet, is now supported on the points d of the two upper rotation axes W of balls R and S on the triplet (thicker dots). It can easily be seen that the rolling radii to the ball/ball and ball/rail member contact points are the same for all three balls. It is also possible to see how the forces are symmetrically subdivided over these application points. A symmetrical structure like the triplet is in a position of subdividing all possible force applications from the outside so that there is always a favourable ratio of high rolling friction to low sliding friction for the overall frictional resistance. The position of the rolling axis and the magnitude of the rolling radii always remain the same although, as stated, the balls can be supported on one or both rails.

Figure 5A:
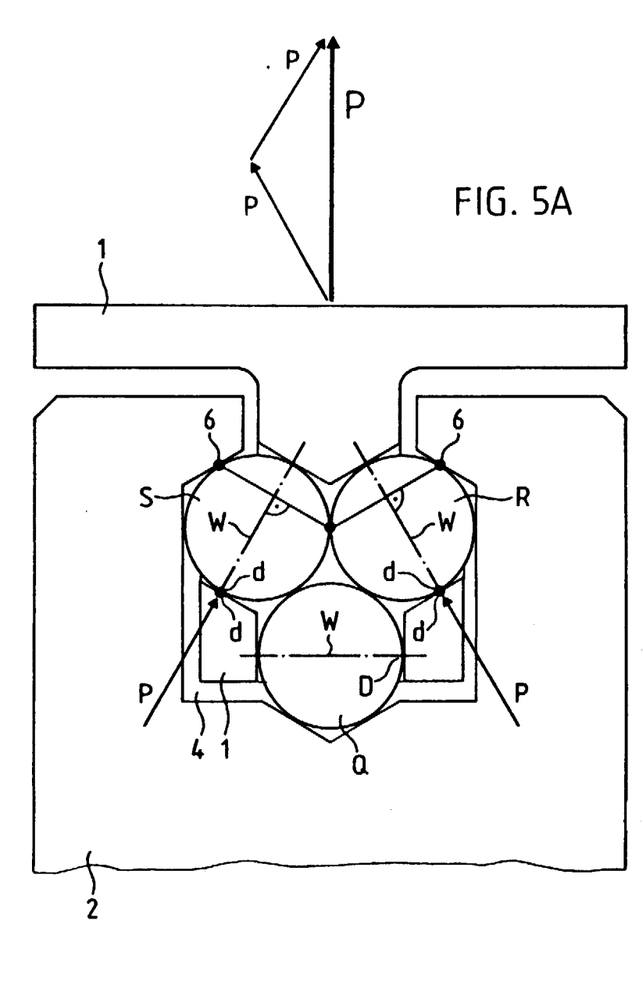
FIG. 5A a view similar to FIG. 4 showing the subdivision of the forces in the rolling body in the case of loading from below through the center (tensile loading)

FIG. 5A shows a force application attempting to draw the rolling body out of its guide channel, such as e.g. occurs in a purely suspended operation, three of the nine possible contact points participating. The two balls R and S are supported on their ball rails 6 and simultaneously relieve ball Q. In this force application, ball Q is neither loaded by the rolling body cage, nor by one of the partner balls and rolls in unloaded manner with them. The rolling body cage is supported on the two rotation-invariant points d of the now facing rotation centers of the two balls R and S. The two rolling axes W are precisely at 60° to one another, as in the loading case of FIG. 4. The rolling radii are identical, so that the two loaded balls have the same circumferential speed and also in this loading case only a very small mixed friction is expected. The third, unloaded ball Q is located on the two partner balls in a suspended operation (but not in the operating case where there is an upward drawing) and rolls on the same without participating in the force action.

Figure 5B:
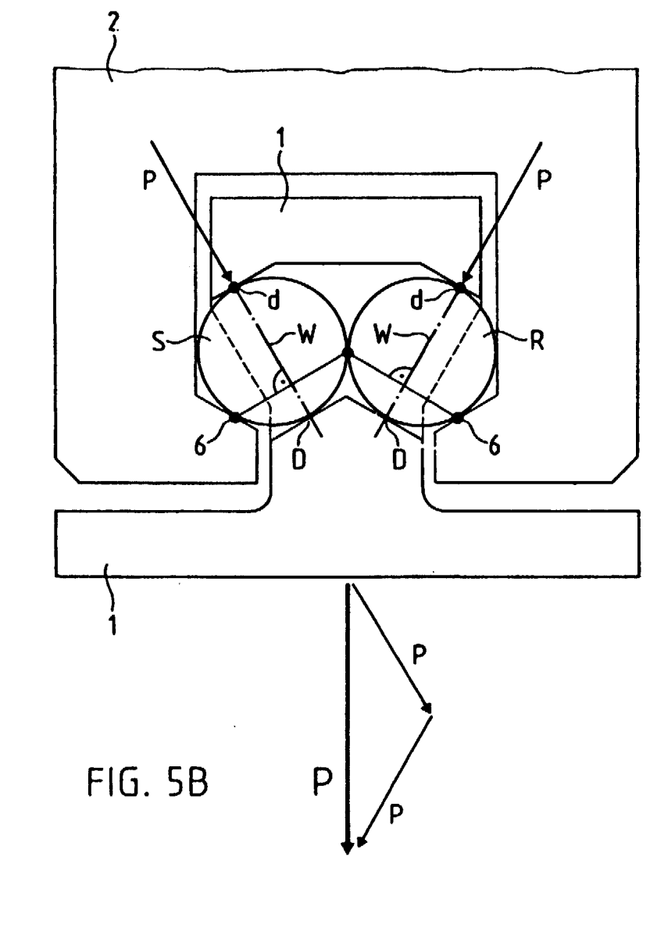
FIG. 5B is an end elevation of a specific embodiment with two rolling elements for a specific operating form, namely tensile loading only.

On the basis of the special loading cage shown in FIG. 5A it is possible to construct a further embodiment with only two balls and which can be used for an overhead conveyor and once again three of the possible nine contact points participate. However, this is a special case for an operating form, in which purely tensile loads occur at right angles to the guide channel. This embodiment is shown in FIG. 5B. The recess provided in FIG. 5A for ball Q is omitted, as is the rail member provided for said ball with the two ball rails in the rolling body guide. The rolling body cage now houses a rolling body pair instead of a triplet and rolls in accordance with the inventive process. For example for an overhead conveyor, chains can e.g. be formed, which can be combined in either elastically flexible or articulated manner, as is recommended for the rolling body triplet. The force resolution under loading corresponds to that discussed in FIG. 5A and need not be discussed again here.

Figure 6:
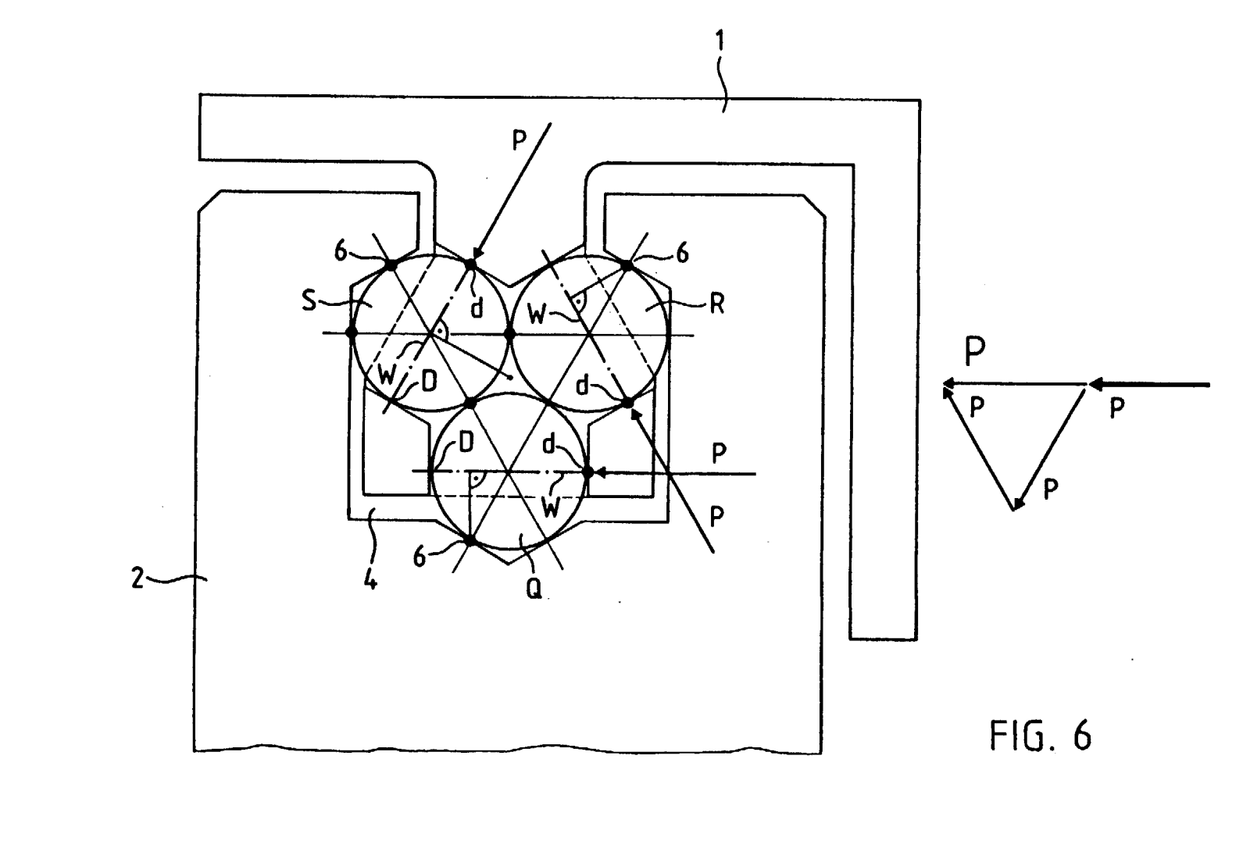
FIG. 6 is an end elevation of an embodiment according to the invention showing subdivision of the forces in the rolling body in the case of loading from the side through the center (side loading)

FIG. 6 shows a loading case in which the guide 2 is pressed laterally on the rolling body 1 or the latter is pressed to the left against the guide, six of the possible contact points participating. This loading case e.g. occurs under the action of centrifugal forces, but the centre of gravity of the rolling body must be in the guide channel. However, this loading case is discussed in order to show that the actually occuring mixed forms of loads follow the same characteristics as shown in ideal form here. Alternatively and for a better understanding, the rolling body cage is widened by an angle on which the force is directed in such a way that it acts precisely on the triplet center.

The rails of ball S press the latter against the two balls R and Q which, as in the two previous cases, are in each case pressed against the ball rail 6 of the particular rail member, so that the triplet can be stabilized. The force acts as if the rolling body was pressed from the right against the guide, so that the cage, indicated as by the arrows of the vector system shown, is supported at three points d on the balls, namely on one rotation center D of each ball. As in the other drawings, D is the general rotation center of a rolling element.

Figure 7:
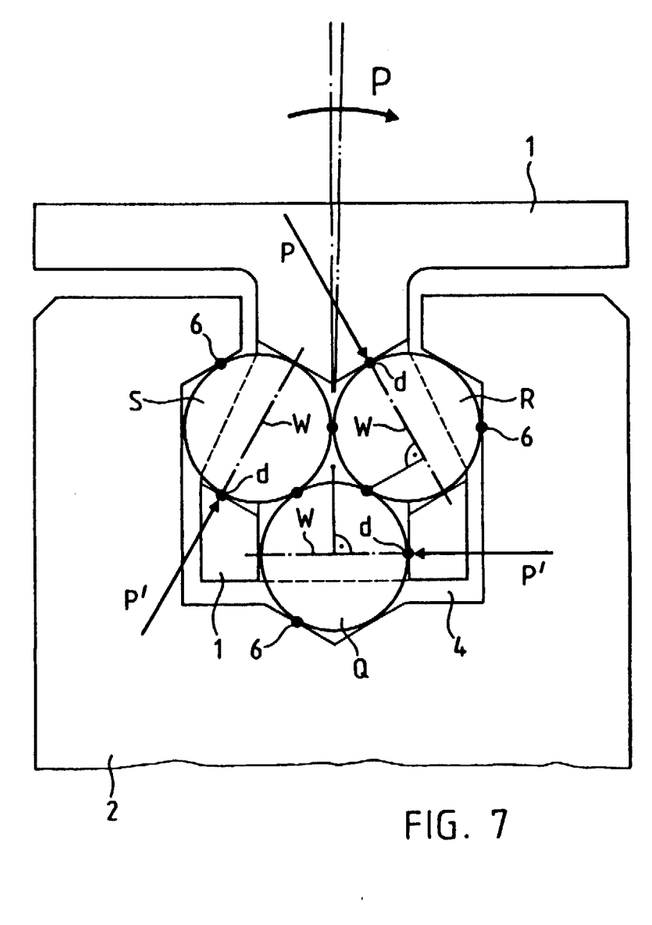
FIG. 7 is an end elevation similar to FIGS. 4 an 5B showing subdivision of forces in the rolling body in the case of twisting loading alongside the centre (rotary loading)

FIG. 7 shows a loading case, according to which the force acting on the rolling bodies attempts to tilt (axially rotate) the same in its guide channel, six of the nine possible contact points participating. Such a tilting has a similar effect on the balls, rail members and cage to one of the previously described force applications to the longitudinal guidance system. As soon as one of the three balls is loaded by the pressure of the cage on one of its rotation centers, it imparts the force acting on it to the two partner balls via the rolling points, so as to take over part of the force and transfer it to the allocated rail members. As stated, this leads to a strengthening of the roller ball triplet, on whose rotation centers the cage is supported at three points. In this case the force application from the cage passes round the triplet balls on points d of rotation centers D, so that the torque shown, which attempts to rotate the rolling body in the guide channel, is formed by the force guidance through virtually all the rolling axes.

FIG. 8 shows an embodiment of a longitudinal guidance system, in which the rolling body guide is closed all around and surrounds in tubular manner a rolling body chain. This embodiment is intended to illustrate the universality of the inventive method and the construction possibilities derivable therefrom. However, it is only shown here after discussing the various loading cases and no further special consideration need be given thereto. Thus, it is a novel chain formed as rolling bodies, running in a closed guide and enabling forces to be axially transferred to a random spatial path. This longitudinal guide can be rigid of flexible, according to choice or the hardness of the material used.

FIG. 8 shows a possibility as to how a rolling body can be placed in an all-round closed rolling body guide 2. A triplet with three balls 3 is arranged in a rolling body cage 1. The rotation centers D, through which the rolling axis W passes, are supported on the faces 5 of cage 1. In slots 6' in the rolling body guide 2 are provided ball rails 6 on which the balls 3 roll. As discussed in connection with FIG. 1D, use is preferably made of four or multi-edge rails instead of round rails, in order to provide a flat rolling path for the balls. This rolling path need only be sufficiently wide to lead to the "snakelike" path resulting from the overall tolerance and the varying force applications.

The rolling body guide 2 can e.g. be manufactured by continuous casting or extrusion and the rail members can subsequently be drawn in or also cast in the same operation. The rolling element cage with the rolling elements are connected either in flexible or articulated manner if a curved configuration is required, but a rigid connection between two or more rolling bodies can also be used. This system is more suitable for a rigid construction than for a flexible construction.

A longitudinal guidance system with rolling body and rolling body guide constructed according to the indicated process can fulfill functions such as are fulfilled by known, exclusively metallic longitudinal guidance systems with balls or other rolling bodies, when such materials are used. If metal and plastic are used, then longitudinal guidance systems are obtained, which are either inexpensive and/or lightweight or have other appropriate characteristics. If a particular mobility is sought, it can also be achieved with the proposed process and one of the proposed embodiments.

In the embodiment shown here, it is less a function of their intended use than the numerous possibilities provided by this teaching. This also applies to the embodiment of FIG. 8.

It is clear that in actual operation one or all the presently discussed force application cases and also mixed forms can alternate in rapid sequence. It can be seen that each force application to the rolling body is always transferred in the direction of the rolling axes of the balls, i.e. partial forces are coupled in to the balls via the rotation centers. The thus loaded ball then rolls via the 2×2 points of rail member and partner balls. The frictional resistance consists of the rolling friction of 9 and not 12 rolling bearing points and the sliding friction from 2 to 3 rotation center points. As the rolling friction, as explained in connection with FIG. 3B, keeps the triplet in balance in the paper plane and this balance is only briefly eliminated by disturbances in the rolling sequence, e.g. by positive/negative accelerations (impacts, vibrations, accelerations and decelerations), but is then restored again, it is also possible to add an "accidental" sliding frictional resistance to the "calculable" frictional resistance, but this can only be determined empirically and has not proved important during tests.

As shown by FIGS. 2A, 2B and 2C, such triplet rolling bodies can be lined up in random form. A ball cage is not much wider than the diameter of the balls used, so that such a rolling body is relatively small. If a plurality of such rolling bodies is connected by an articulated or elastic connection, a chain rolling very easily in its guide can be obtained which is e.g. very suitable for a chain conveyor. If in the case of a conventional chain conveyor the chain is pushed or drawn through the guide channel, considerable sliding resistances occur, which must be reduced by the use of lubricants. These sliding resistances also constitute a limit for the chian conveyor length. It is clear that in the case of a chain formed from the proposed rolling bodies the use of lubricants is not decisive and a chain sliding in a channel has nowhere near such a low resistance as a chain rolling in its channel.

I claim:

1. A process for controlling the rolling of rolling elements in a system of the type having three rolling elements, a rolling element retaining cage for coupling externally-imposed forces to and from the rolling elements and a guide for receiving and guiding movement of the rolling elements and the cage, comprising the steps of
    positioning the rolling elements in the guide so that each rolling element is in rolling point contact with a surface of the guide and is in rolling point contact with at least one other rolling element, the rolling contact points defining a line passing through those points and the locus of the points defining at least one circle along which the element rolls, and
    positioning the surfaces of the cage with respect to the rolling elements so that forces coupled to the rolling elements are coupled, through surface contact of the cage with each element, to a location on the rolling element so that a vector representation of the coupled force is substantially perpendicular to and bisects the line passing through the rolling contact points, the length of one-half of the line being equal to the rolling radius of the circle along which the rolling element rolls, and wherein each rolling radius is smaller than the largest radius of the rolling element.

2. A process according to claim 1 wherein each rolling element is a sphere.

3. A longitudinal guidance system comprising the combination of
    a rolling body including three rolling elements and a cage having means defining three outwardly-opening chambers in said cage for receiving and retaining said rolling elements and surfaces in said chambers for transferring forces to and from said rolling elements; and
    a rolling body guide including a channel for receiving said rolling body, said channel having internal surfaces with a plurality of rails for making rolling contact with said rolling elements so that each rolling element is in rolling contact with a guide rail surface and is in rolling contact with at least one other rolling element at a single point, the rolling contact points defining a circle along which the element rolls and, at each instant, a connecting line passing through those points, said connecting lines for two contacting elements forming an obtuse angle;
    each said force-transferring surface in said chambers being positioned so that a line perpendicular to said surface is also perpendicular to said connecting line of a rolling element in said chamber.

4. A system according to claim 3 wherein each said rolling element has a center and the centers of said rolling elements lie in a single plane, and wherein said cage includes three force-transferring surfaces forming an angle of 120° with each other.

5. A system according to claim 4 wherein the rolling elements are balls.

6. A system according to claim 5 wherein said cage is made of a softer material than said rolling elements.

7. A longitudinal guidance system comprising the combination of
    a rolling body including a plurality of rolling elements and a cage having means defining outwardly-opening chambers for receiving and retaining said rolling elements and surfaces in said chambers for transferring forces to and from said rolling elements,
    each of said outwardly-opening chambers including a mouth having a tapered rim tapering to a diameter smaller than the largest diameter of a rolling element to be received therein so that a rolling element placed in said chamber is trapped therein, and
    a rolling body guide including a channel for receiving said rolling body, said channel having internal surfaces with a plurality of rails for making rolling contact with said rolling elements so that each rolling element is in rolling contact with a guide rail surface and is in rolling contact with at least one other rolling element at a single point, the rolling contact points defining a circle along which the element rolls and, at each instant, a connecting line passing through those points, said connecting lines for two contacting elements forming an obtuse angle;
    each said force-transferring surface in said chambers being positioned so that a line perpendicular to said surface is also perpendicular to said connecting line of a rolling element in said chamber.

8. A system according to claim 7 wherein said cage is formed from a material having sufficient elasticity to permit a rolling element to be forced through said rim.

9. A system according to claim 8 which includes at least two rolling element cages, each having a plurality of rolling elements, in a rolling body guide.

10. A system according to claim 9 wherein each said rolling element cage and its plurality of rolling elements comprises a rolling body, said system further comprising elastically flexible means for interconnecting adjacent ones of said rolling bodies.

11. A system according to claim 7 wherein each guide rail surface comprises a pair of parallel rolling element rails.

12. A system according to claim 11 wherein said rolling element rails are made of a harder material than the remainder of said guide channel.

13. A longitudinal guidance system comprising the combination of
- a rolling body including three rolling elements and a cage having means defining outwardly-opening chambers for receiving and retaining said rolling elements and surfaces in said chambers for transferring forces to and from said rolling elements; and
- a rolling body guide including a generally tubular, closed body having a channel for receiving said rolling body, said channel having internal surfaces with a plurality of uniformly spaced rolling element rails therein for making rolling contact with said rolling elements so that each rolling element is in rolling contact with a guide rail surface and is in rolling contact with at least one other rolling element at a single point, the rolling contact points defining a circle along which the element rolls and, at each instant, a connecting line passing through those points, said connecting lines for two contacting elements forming an obtuse angle;
- each said force-transferring surface in said chambers being positioned so that a line perpendicular to said surface is also perpendicular to said connecting line of a rolling element in said chamber.

14. A rolling support apparatus comprising the combination of
- a rolling body including
  - three spherical rolling elements, and
  - a cage having means defining three outwardly-opening uniformly spaced chambers having axes lying in a single plane, each chamber containing a single spherical rolling element, each of said chambers having a surface for transferring forces to and from a rolling element; and
- a rolling body guide including a generally tubular channel for receiving said rolling body, said channel having internal surfaces for making rolling contact with said rolling elements so that each rolling element is in rolling point contact with a guide rail surface and is in rolling point contact with at least one other rolling element, said rolling contact points defining a connecting line passing through said points and the locus of said points defining a circle along which the element rolls;
- each said force-transferring surface in each said chamber being positioned so that a line perpendicular to said force-transferring surface is a perpendicular of said connecting line of said rolling element in said chamber when said surface-perpendicular line passes through the point on said surface from and to which force is transferred.

* * * * *